United States Patent [19]

Würmli

[11] B 4,009,996
[45] Mar. 1, 1977

[54] REACTION PRODUCTS OF PHENOLSULPHONIC ACID-UREA-FORMALDEHYDE AS TANNING AGENTS AND PROCESS FOR THEIR MANUFACTURE

[75] Inventor: Albert Würmli, Riehen, Switzerland

[73] Assignee: Ciba-Geigy Corporation, Ardsley, N.Y.

[22] Filed: Nov. 5, 1974

[21] Appl. No.: 520,995

[44] Published under the second Trial Voluntary Protest Program on March 23, 1976 as document No. B 520,995.

[30] Foreign Application Priority Data

Nov. 8, 1973   Switzerland .................... 15715/73

[52] U.S. Cl. ................................ 8/94.24; 8/94.21; 260/49

[51] Int. Cl.$^2$ ................. C08G 75/20; C08G 75/24; C14C 3/20

[58] Field of Search ............ 260/49; 8/94.24, 94.21

[56] References Cited

UNITED STATES PATENTS

| | | | |
|---|---|---|---|
| 2,127,068 | 8/1938 | Muller | 260/49 |
| 2,129,553 | 9/1938 | Russell et al. | 260/49 |
| 2,271,245 | 1/1942 | Biedermann | 260/49 |
| 2,716,098 | 8/1955 | Biedermann | 260/49 |
| 2,809,088 | 10/1957 | Meister et al. | 8/94.21 |
| 3,010,779 | 11/1961 | Komarek et al. | 8/94.18 |
| 3,475,113 | 10/1969 | Sellet | 260/49 |
| 3,852,374 | 12/1974 | Erdmann et al. | 8/94.24 |

FOREIGN PATENTS OR APPLICATIONS 683,084   11/1952   United Kingdom

*Primary Examiner*—Donald E. Czaja
*Assistant Examiner*—H. H. Fletcher
*Attorney, Agent, or Firm*—Joseph G. Kolodny; Edward McC. Roberts; Prabodh I. Almaula

[57] ABSTRACT

The invention relates to reaction products of phenolsulphonic acid-urea-formaldehyde as agents for tanning of skins or leather. They are manufactured from a hydroxyphenylsulphone-hydroxyphenyl-monosulphonic acid which is condensed with an alkoxybenzene, this condensation product being reacted at elevated temperature in an aqueous-acid medium with an urea formaldehyde mixture or with a methylolated urea.

13 Claims, No Drawings

REACTION PRODUCTS OF PHENOLSULPHONIC ACID-UREA-FORMALDEHYDE AS TANNING AGENTS AND PROCESS FOR THEIR MANUFACTURE

The invention relates to reaction products of phenolsulphonic acid- urea- formaldehyde from
A 100 parts by weight of a condensation product from
  a 1 mole of a hydroxyphenylsulphone-hydroxyphenyl-monosulphonic acid having 1 to 4 hydroxyphenylsulphone groups per molecule, and
  b 0.1 to 0.6 mole of an alkoxybenzene having 1 to 4 carbon atoms in the alkoxy radical, and
B 10 to 40 parts by weight of a reaction product or of a mixture of at least
  c. 1 mole of urea and/or of a urea derivative and
  d. 1 to 4 moles of formaldehyde or of an agent releasing formaldehyde.

Preferred reaction products are those from 100 parts by weight of a condensation produce (A) consisting of the constituents (a) and (b) in a molar ratio (a):(b) of 1 : 0.1 to 0.55, especially 1 : 0.3 to 0.5, and 18 to 30 parts by weight of a mixture (B) of the constituents (c) and (d) in the molar ratio (c):(d) of 1 : 1 to 2. Instead of the preferred mixture of (c) and (d), already methylolated products can be used as reaction product (B).

A suitable constituent (a) is, in particular, a hydroxyphenylsulphone-hydroxyphenyl-monosulphonic acid having 1 to 2 hydroxyphenylsulphone groups per molecule, which corresponds to the following probable formula

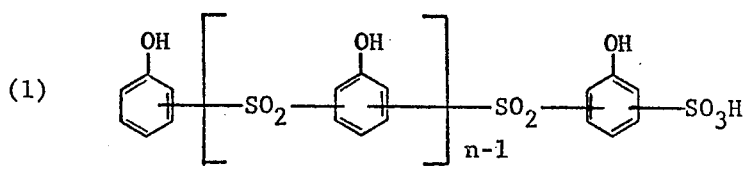

(1)

wherein $n$ represents 1 or 2 or any given value in between.

There is used as constituent (b), in particular, ethoxybenzene or preferably methoxybenzene.

Suitable as constituent (c) are, besides the preferred urea, e.g. the following urea derivatives: biuret, thiourea, guanidine, dicyandiamide, urethan, ethyleneurea, dihydroxyethyleneurea and propyleneurea, acetylenediurea and/or oxadiazine. Preferred urea derivatives are ethyleneurea and, in particular, biuret.

As constitutent (c) there are preferably used
c'. urea and/or biuret, and, optionally,
c". at least one urea derivative which is different from constituent c'.

Constituent (c') can constitute either compounds used on their own or mixtures of different compounds. Biuret and, in particular, urea used on their own have proved to be especially suitable. Of particular interest are constitutents (c) consisting of 1 mole of constituent (c') and 0 to 0.2 mole of constituent (c").

A suitable agent releasing formaldehyde in the case of constituent (d) is, in particular, paraformaldehyde. As constituent (d) there is preferably used formaldehyde itself, especially in the form of an aqueous solution.

In the case where already methylolated products, and not the preferred mixture of constituents (c) and (d), constitute the reaction product (B), then the methylolated, specially the mono- or, in particular, the dimethylolated, reaction products of
c'. urea and/or biuret, and, optionally,
c". at least one urea derivative which is different from the constituent (c)
are employed.

These methylolated products can either be individual compounds or mixtures of different compounds. Compounds which have proved particularly suitable are mono- or dimethylolthiourea, mono- or dimethylolbiuret and/or mono- or dimethylolurea, with dimethylolurea on its own giving the best results.

Of particular interest are methylolated reaction products of 1 mole of constituent (c') and 0 to 0.2 mole of constituent (c") with constituent (d).

The reaction products according to the invention are obtained by a process in which 100 parts by weight of the condensation produce (A) are reacted with 10 to 40 parts by weight of the reaction product or mixture (B) at elevated temperature in an aqueous-acid medium, and, after completion of the reaction, the reaction mixture is neutralised.

For the constituent (a) required for the obtainment of the condensation product (A), phenol is firstly sulphonated in a known manner by means of sulphuric acid or oleum at elevated temperature, such as 100° to 110°C, and the phenolsulphonic acid thus obtained is subsequently condensed with itself under the reduced pressure of at most 25 Torr at a temperature of at least 140°C and at most 190°C. In this manner, there are obtained, as constituent (a), compounds which correspond to the probable formula (1). The value of n depends largely on the temperature of self-condensation; in the lower temperature range of 140° to about 155°C, the value of n remains essentially 1; with rising temperature in the medium range of about 155° to about 170°C, the value of n gradually increases towards 2; in the upper temperature range of about 170° to 190°C, the value of $n$ increases still further, with the maximum value for $n$ of 4 at about 190°C not as a rule being exceeded.

At a temperature of below 140°C, self-condensation proceeds too slowly, while temperatures exeeding 190°C are to be avoided because they can cause an undesirable darkening of constituent (a). The course of the self-condensation reaction can be observed by titration of the sulphonic acid group of a specimen of the reaction mixture with a sodium hydroxide solution, with the use of Congo red as indicator.

After completed self-condensation, the constitutent (b) is added to the resulting constituent (a), and the whole is condensed at a temperature of at least 120°C and at most 180°C under reduced pressure to give the condensation product (A). At a temperature of below 120°C, condensation proceeds too slowly, while temperatures exceeding 180°C can cause an undesirable darkening of the condensation product. The preferred temperature range is between 145° and 155°C. After the addition of constituent (b), the reaction mixture is as a rule again slowly put under reduced pressure, whereby it should be ensured that, in particular, reaction water is distilled off and, as far as possible, no constituent (b).

In the course of the condensation reaction in the preferred temperature range, the pressure is slowly reduced towards 10 to 13 Torr, which in most cases requires 3 to 4 hours. In order to complete the condensation reaction, the reaction mixture as a rule is stirred in the preferred temperature range at a stable reduced pressure of 10 to 13 Torr for a further ½ to 1 hour.

As initially mentioned, the constituent (b) in the preparation of condensation product (A) is always used in an amount less than the stoichiometric amount with respect to (a). There are therefore obtained no homogeneous condensation products (A) but always mixtures of different compounds.

Depending on the molar ration (a):(b), e.g. in the case of the molar ration (a):(b) of 1 : 0.1 to 0.6, there are obtained mixtures containing, for example, the following two compounds:
1. 0.9 to 0.4 mole of unreacted constituent (a) which corresponds to the probable formula (1), and
2. 0.1 to 0.6 mole of a reaction product corresponding in the case where methoxybenzene is used as constituent (a'') to the probable formula (2)

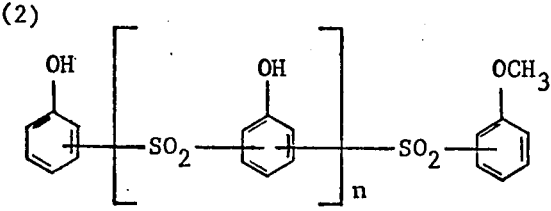

wherein, as in formula (1), n represents 1 or 2 or any given value in between.

After completed condensation of (a) with (b), 20 to 40 parts by weight of water are added to 100 parts by weight of the reaction mixture, i.e. of the condensation product according to (A).

There are subsequently added 10 to 40, preferably 18 to 30, parts by weight of the reaction product (B) or of the mixture (B).

With an application of less than 10 parts by weight of (B) to 100 parts by weight of (A), there are obtained condensation products (A)+(B) having for use as tanning substances either too low a water-solubility or too low a tanning action. With an application of more than 40 parts by weight of (B) to 100 parts by weight of (A), very viscous reaction products having an inadequate tanning action are obtained.

The condensation of (A) with (B) is performed by the further stirring of the reaction mixture, now consisting of an aqueous homogeneous melt, for 4 to 12 hours at 55° to 65°C, preferably for 7 to 9 hours at 60° to 65°C.

The reaction is after this time complete, whereupon the reaction mixture, the pH-value of which as a rule is less than 1, is neutralised with an organic or, in particular, inorganic base to a pH-value of 4 to 7, preferably 4 to 5.

The organic bases used can be primary, secondary or tertiary alkylamines having 1 to 6 carbon atoms, especially ethanolamines. Those preferred are mono-, di- or trimethylamines or mono-, di- or triethylamines, particularly mono-, di- or triethanolamines.

The inorganic bases used can be alkaline-earth hydroxides or, in particular, alkali hydroxides. Those preferred are magnesium hydroxide, particularly potassium or sodium hydroxides, with preference being given to concentrated aqueous solutions. Ammonia constitutes a specially suitable inorganic base, particularly as concentrated aqueous solution.

The now neutralised reaction solution is subsequently adjusted with an organic acid to have a pH-value of 2.8 to 3.8, preferably 3.2 to 3.5.

Organic acids normally used are aliphatic carboxylic acids having 1 to 6 carbon atoms; and the acids which have proved advantageous are, in particular, the following: citric, lactic, maleic and oxalic acid. Acetic acid and especially formic acid have proved most suitable.

The reaction products according to the invention are obtained most simply and most economically by a process in which the constituent (a) is reacted with an amount of constituent (b) that is less than the stoichiometric amount with respect to (a), so that the resulting condensation product (A), as previously mentioned, is a mixture of, e.g. 0.9 to 0.4 mole of unreacted constituent (a) and, e.g. 0.1 to 0.6 mole of the reaction product from (a) and (b), which mixture is further processed.

It is however also possible to obtain the reaction product by complete reaction of the constituents (a) and (b) in stoichiometric amounts in a separate reaction step and to isolate it. For example, 0.1 to 0.6 mole of the reaction product produced in this manner can be mixed with, e.g. 0.9 to 0.4 mole of unreacted constituent (a), with the resulting mixture being the same as that obtainable in one operation.

The new phenolsulphonic acid- urea- formaldehyde reaction products according to the invention can be used as substances having a tanning action. All skins and types of leather can be tanned or re-tanned with the reaction products according to the invention.

The reaction products according to the invention can, at the same time, be used as tanning substances, filling agents and/or bleaching agents.

The present invention hence relates also to an agent for tanning or re-tanning skins and leather, the said agent being characterised by the content of a reaction product of the composition given in the foregoing.

Advantageously, the procedure is such that skins or leather are treated with an aqueous solution containing at least one reaction product according to the invention; the material tanned in this manner is subsequently rinsed and then stuffed and dried. Optionaly, stuffing can be preceded by a dyeing operation. to 100 parts by weight of leather or of skins there are used, as a rule, 100 to 250, preferably 150 to 200, parts by weight of water and 1 to 30 parts by weight of at least one of the reaction products according to the invention. There is carried out especially the tanning of 100 parts by weight of delimed raw hide with 150 to 200 parts by weight of water and 12 to 32 parts by weight of a reaction product according to the invention.

In particular, 100 parts by weight of leather, optionally chrome-tanned and neutralised in the usual manner with, e.g. formiates or bicarbonates, are re-tanned with 1 to 20, preferably 1 to 8, parts by weight of one of the reaction products of the invention in aqueous solution.

The tanned material is after-rinsed, and subsequently stuffed with a standard, preferably light-fast, stuffing agent based on, e.g. sulphonated sperm oil or neat's foot oil. After drying, there is obtained a white, or very light-coloured, leather, which has excellent fastness to light, a fine, compact, smooth grain and a soft handle. It is specially on chrome leather that the intense bleaching effect resulting from re-tanning is particularly advantageous.

The reaction products of phenolsulphonic acid- urea-formaldehyde according to the invention are in the form of aqueous solutions having a content of dry material of, e.g. 30 to 45 per cent by weight, preferably 38 to 41 per cent by weight, or in the form of powders having, as a rule, an effective dry content of 90 to 100 per cent by weight.

Relative to the 30 to 45 per cent solutions of the reaction products, the applied amounts to each 100 parts by weight of leather or skins is as a rule 3 to 80, preferably 30 – 80 parts by weight, or in the case of application for re-tanning 3 to 20 parts by weight.

Percentages and parts in the following examples are per cent by weight and parts by weight, respectively. Parts by volume have the same relationship to parts by weight as ml to g.

EXAMPLE 1

478 parts of 20% oleum are added to 500 parts of melted phenol with stirring and cooling in a manner ensuring that the temperature does not exceed 70°C, and the whole is subsequently sulphonated for 1 hour at 105°C. The formed phenolsulphonic acid is slowly heated under a reduced pressure of 11 to 13 Torr to 150° to 155°C, and is held at this temperature until 1 g of the reaction mixture neutralises to Congo red 3.8 to 4.0 ml of 1N sodium hydroxide solution.

100 parts of methoxybenzene are added at 150°C to the hydroxyphenylsulphone-(poly)-hydroxyphenylmonosulphonic acid obtained in the above-described manner. The reaction mixture is further stirred until a homogeneous mixture results. The pressure is subsequently carefully again reduced, so that as far as possible no methoxybenzene distills off but only reaction water. When the pressure has again fallen to 11 to 30 Torr and remains stable at this value and no further water distills off, the reaction of the methoxybenzene is complete.

25 parts of water are added to 100 parts of this mixture of unreacted hydroxyphenylsulphone-(poly)-hydroxyphenylmonosulphonic acid and the corresponding methoxy derivative. In the resulting homogeneous melt there are dissolved 14 parts of urea. An addition is made dropwise at 60° to 65°C of 42 parts of formaldehyde as 30% aqueous solution. After the dropwise additon is completed, the temperature is maintained for 8 hours at 60° to 65°C. After the addition of 100 parts of water and after neutralisation with 30 parts of 25% aqueous ammonia to pH 4.0, the pH-value is adjusted with formic acid to 3.4.

There is obtained in this manner a light-yellow, clear, water-soluble syrup, the analysis of which gives the following values:

| | |
|---|---|
| dry content: | 39.6% |
| tanning substances: | 33.2% |
| non-tanning substances: | 6.4% |
| percentage: | 83.8 |
| viscosity: | 18 seconds efflux time. |

The analysis of tanning substances is performed by the filter process of the VGCT (Verein fur Gerbereichemie und Technik) (see in this connection "Das Leder" (Leather) 5[2], 28 to 31 (1954)).

The viscosity is measured according to DIN 53211, and is based on the determination of the efflux time at 25°C from a viscosimetric cup having an outlet aperture of 4 mm inside diameter.

EXAMPLE 2

500 parts of melted phenol are mixed with 500 g of a sulphuric acid present as a 100% acid, and the whole is sulphonated at 105°C for 1 hour. The formed phenolsulphonic acid is slowly heated under reduced pressure of 11 to 13 Torr to 165° to 170°C, and is held at this temperature until 1 g of the reaction mixture neutralises, to a Congo red indicator, 3.0 to 3.2 ml of 1N sodium hydroxide solution.

The resulting hydroxyphenylsulphone-(poly)-hydroxyphenylmonosulphonic acid is cooled to 150°C; 100 parts of methoxybenzene are added and the whole is well mixed. The homogeneous mixture is carefully put under reduced pressure; only reaction water should then distill off and no methoxybenzene. At 150° to 155°C, the pressure is now further reduced until it is again 11 to 13 Torr and remains stable at this value. The reaction is complete when no further water distills off.

100 parts of the reaction melt are mixed with 25 parts of water: 9 parts of urea are then dissolved in the homogeneous melt at 80°C. An addition is made dropwise at 60° to 65°C of 30 parts of formaldehyde as a 30% aqueous solution. After the dropwise additon is completed, stirring is continued for 6 hours at 60° to 65°C. After the addition of 110 parts of water and after neutralisation with 25 parts of 25% aqueous ammonia to give pH 4.0, the pH-value is adjusted with formic acid to 3.5.

There is obtained in this manner a light-yellow syrup, which dissolves in water to give a clear solution.

The resulting product gives the following analysis values (see analysis methods in Example 1):

| | |
|---|---|
| dry content: | 42.6% |
| tanning substances: | 35.3% |
| non-tanning substances: | 7.3% |
| percentage: | 83.0 |
| viscosity: | 16 seconds efflux time. |

EXAMPLE 3

420 g of 66% oleum is added to 500 parts of melted phenol (50°C) with cooling and vigorous stirring so that the temperature of the reaction mixture does not exceed 70°C; sulphonation is subsequently performed for 1 hour at 110°C. The formed phenolsulphonic acid is put under reduced pressure and heated as quickly as possible to 145°C. The self-condensation reaction is continued at this temperature until 1 g of the reaction mixture neutralises, to Congo red, 4.6 ml of 1N sodium hydroxide solution.

144 parts of ethoxybenzene are added to the hydroxyphenylsulphone-(poly)-hydroxyphenyl-monosulphonic acid thus obtained. When a homogeneous mixure is obtained, the pressure is carefully lowered again and, at the same time, the temperature of the reaction mixture is raised to 155°C. As far as possible only reaction water should be distilled off during this operation. When after about 3 to 4 hours the pressure is 11 to 13 Torr and remains stable at this value, then all the ethoxybenzene has been reacted.

20 parts of water are added to 100 parts of the mixture obtained. To the homogeneous solution there are added 14 parts of a urea/biuret mixture containing 30% biuret. An additon is then made dropwise at 65° to 70°C of 34 parts of formaledhyde as a 37% aqueous solution. After the dropwise addition is completed, condensation is performed at 70°C for 6 hours. After the addition of 80 parts of water, neutralisation is effected with 58 parts of a 30% aqueous sodium hydroxide solution to give pH 4. The adjustment to the finished tanning substance is made with 12 parts of an 80% aqueous acetic acid solution.

There is obtained in this manner a light-brown, opalescent soluble syrup, the analysis of which gives the following values (see analysis methods in Example 1):

| | |
|---|---|
| dry content: | 39.4% |
| tanning substances: | 31.3% |
| non-tanning substances: | 8.1% |
| percentage: | 79.5 |
| viscosity: | 77 seconds efflux time. |

EXAMPLE 4

25 parts of water are added to 100 parts of the mixture, obtained in Example 1, of unreacted hydroxyphenylsulphone-(poly-hydroxyphenyl-monosulphonic acid and the corresponding methoxy derivative, and the whole is heated at 75° – 80°C. To the formed melt there is added dropwise a solution of 24 parts of dimethylurea in 50 parts of water. After completion of the dropwise addition, condensation is performed for 4 hours at 75° – 80°C. An addition of 70 parts of water is made and the whole is neutralised with 24 parts of ethanolamine to pH 4.9, and subsequently acidified with lactic acid to pH 3.0.

There is obtained a light-yellow syrup which dissolves in water to give a clear solution.

The tanning product has the following analysis values:

| | |
|---|---|
| dry content: | 38.8% |
| tanning substances: | 35.0% |
| non-tanning substances: | 3.8% |
| percentage: | 90.3 |
| viscosity: | 45 seconds efflux time. |

EXAMPLE 5

Into 500 parts of melted phenol there are poured, with stirring and cooling, 435 g of 66% oleum, in such a manner that the temperature does not exceed 90°C. After completion of the addition, sulphonation is performed for one hour at 105°C. The resulting phenolsulphonic acid is heated under reduced pressure of 11 – 13 Torr rapidly to 170°C, and is held at this temperature until 1 g of the reaction product neutralises 3.4 ml of 1N sodium hydroxide solution to a Congo red indicator. The temperature of the reaction mixture is then allowed to fall at normal pressure to 130°C, and 15 g of methoxybenzene is added. After thorough mixing, the pressure at 130° – 135°C is carefully reduced again to the extent that no methoxybenzene distills off. When the pressure has again fallen to 11, the reaction of the methoxybenzene is complete.

25 parts of water are added to 100 parts of this mixture of unreacted hydroxyphenyl-sulphone-(poly)-hydroxyphenyl-monosulphonic acid and of the corresponding methoxy derivative and the whole is dissolved. To the homogeneous melt there are added at 75°C parts of urea. After dissolving of the urea, an addition is made dropwise of 16.5 parts of formaldehyde as a 30% aqueous solution. After this addition is completed, the temperature is held at 75° – 80°C for a further 4 hours. The reaction product, clearly soluble in water, is diluted with 52 parts of water, and subsequently neutralised with 27 parts of 25% aqueous ammonia to pH 4.0. The tanning substance is finally brought to pH 3.6 with acetic acid.

There is obtained a clear light-brown syrup, the analysis of which gives the following values:

| | |
|---|---|
| dry content: | 38.8% |
| tanning substances: | 35.0% |
| non-tanning substances: | 3.8% |
| percentage: | 90.3 |
| viscosity: | 14.8 seconds. |

EXAMPLE 6

100 parts of the mixture, obtained according to Example 5, consisting of unreacted hydroxyphenyl-sulphone-(poly)-hydroxyphenyl-monosulphonic acid and the corresponding methoxy derivative are mixed with 40 parts of water, and the whole is heated to 80°C. 5 parts of urea are dissolved in the homogeneous solution and this solution is cooled to 40°C. 10 parts of paraformaldehyde are then so added in portions that the temperature in the reaction solution is 40° – 45°C. After completion of the paraformaldehyde addition, subsequent condensation is performed at 40° to 45°C for a further 12 hours. The reaction solution is afterwards diluted with 130 parts of water, and neutralised with 28 parts of 25% aqueous ammonia to give pH-value of 4.0. The pH-value is then adjusted to 2.8 with a mixture of acetic acid and formic acid. There is obtained a clear light-brown solution, the analysis of which gives the following values:

| | |
|---|---|
| dry content: | 32.5% |
| tanning substances: | 30.5% |
| non-tanning substances: | 2.0% |
| percentage: | 94.0 |
| viscosity: | 18.9 seconds. |

EXAMPLE 7

100 parts of the mixture, obtained according to Example 5, consisting of unreacted hydroxyphenyl-sulphone-(poly)hydroxyphenyl-monosulphonic acid and the corresponding methoxy derivative are mixed with 25 parts of water, and the whole is heated at 80°C. To the solution there are added 7 parts of urea and 2.05 parts of N,N'-ethyleneurea. A dropwise addition is then made at 70° – 75°C of 27 parts of formaldehyde as a 30% solution. After the formaldehyde addition, condensation is performed for 4 hours at 70°C. After this period of time, the whole is diluted with 115 parts of water, and subsequently neutralised with 27 parts of 25% aqueous ammonia to pH 4.0. The pH-value is thereupon adjusted to 3.5 with acetic acid.

There is obtained in this manner a light-brown, clear soluble syrup giving the following analysis values:

| dry content: | 34.5% |
|---|---|
| tanning substances, | 2.9% |
| non-tanning substances: | 37.4% |
| percentage: | 92.2 |
| viscosity: | 14.6 seconds. |

EXAMPLE 8

100 parts of the mixture obtained according to Example 2 consisting of unreacted hydroxyphenyl-sulphone-(poly-hydroxyphenyl-monosulphonic acid and the corresponding methoxy derivative are dissolved with 25 parts of water at 75°C. After the addition of 21 parts of urea, the mixture is cooled to 65°C. A dropwise addition is then made of 62 parts of formaldehyde as a 30% solution in a manner ensuring that the temperature of 65°C is just maintained. After completion of the addition, stirring is continued at the same temperature for 8 hours. Dilution is performed with 60 parts of water, and the whole is diluted with 47 parts of 30% aqueous sodium hydroxide solution to pH 4.2. The pH-value is finally adjusted to 3.1 with acetic acid.

There is obtained a light-brown viscous syrup, which is soluble in water to produce a slight opalescence. The analysis gives the following values:

| dry content: | 40.9% |
|---|---|
| tanning substances: | 31.2% |
| non-tanning substances: | 9.7% |
| percentage: | 76.2 |
| viscosity: | 57 seconds. |

EXAMPLE 9

33 parts of water are added to 100 g of the mixture, obtained according to Example 1, of unreacted hydroxyphenyl-sulphone-(poly-hydroxyphenyl-monosulphonic acid and the corresponding methoxy derivative, and the mixture is heated at 65°C. In the homogeneous melt there are dissolved 14 parts of urea. An addition is made dropwise at 60° – 65°C of 34 parts of formaldehyde as a 37% solution, and stirring is subsequently maintained at 60°C for 8 hours, whereupon 50 parts of water are added. 51 parts of 30% sodium hydroxide solution are required to effect neutralisation to Ph 6.0. The solution is concentrated at 70° – 80°C in vacuo to dryness. After the addition of 5 parts of oxalic acid, the dry product is pulverised to obtain 135 g of a cream-coloured water-soluble powder. The analysis of tanning substance gives the following values:

| dry content: | 93.0% |
|---|---|
| tanning substances: | 69.4% |
| non-tanning substances: | 23.6% |
| percentage: | 74.6 |

EXAMPLE 10

100 parts of chrome-tanned calf leather neutralised in the usual manner are re-tanned with a solution of 200 parts of water and 4 parts of a reaction product (parts calculated on dry substance) according to one of the Examples 1 to 8 for 2 hours.

After rinsing, the re-tanned leather is stuffed, in the usual manner, with 4 to 6 parts of a light-fast stuffing agent based on sulphonated sperm oil, and subsequently dried.

There is obtained a leather of a very light colour having excellent fastness to light and a compact fine grain.

EXAMPLE 11

100 parts of chrome-tanned neat's leather neutralised in the usual manner are re-tanned with 150 parts of water and 4 parts of the reaction product (parts calculated on dry substance) according to Example 1 for 2 hours. After stuffing and drying, there is obtained a leather of a very light colour having excellent fastness to light and possessing a compact fine grain.

EXAMPLE 12

100 parts of a delimed raw calf-hide are tanned with 200 parts of water and 18 parts of a reaction product (parts calculated on dry substance) according to one of the Examples 1 – 9 for 24 hours. After stuffing and working up, there is obtained a white light-fast leather having a soft handle and a fine grain.

EXAMPLE 13

100 parts of an unneutralised chrome-tanned calf leather are re-tanned with 200 parts of water and 6 parts of the reaction product (parts calculated on dry substance) according to Example 3 for 2 hours. After rinsing and stuffing, the material is dried. The leather obtained in this manner is almost white and possesses a smooth grain.

I claim:

1. Reaction product of phenolsulphonic acid-urea-formaldehyde from
   A  100 parts by weight of a condensation product from
      a. 1 mole of a hydroxyphenylsulphone-hydroxyphenylmonosulphonic acid having 1 to 4 hydroxyphenylsulphone groups per molecule, and
      b. 0.1 to 0.6 mole of an alkoxybenzene having 1 to 4 carbon atoms in the alkoxy radical, and
   B  10 to 40 parts by weight of a reaction product or of a mixture of
      c. 1 mole of urea and/or of a urea derivative and
      d. 1 to 4 moles of formaldehyde or of an agent releasing formaldehyde.

2. Reaction product according to claim 1, wherein there are used to 100 parts by weight of condensation product (A): 18 to 30 parts by weight of reaction product (B) from 1 mole of constituent (c) and 1 to 2 moles of constituent (d); or 18 to 30 parts by weight of mixture (B) of 1 mole of constituent (c) and 1 to 2 moles of constituent (d).

3. Reaction product according to claim 1, wherein 0.3 to 0.5 mole of ethoxybenzene or methoxybenzene is used as constituent (b).

4. Reaction product according to claim 1, wherein a hydroxyphenylsulphone-hydroxyphenyl-monosulphonic acid having 1 to 2 hydroxyphenylsulphone groups per molecule is used as constituent (a).

5. Reaction product according to claim 1, which are obtained by the use of a mixture (B) consisting of the constituents (c) and (d).

6. Reaction product according to claim 1, wherein there are used, as constituent (c):
 c'. 1 mole of urea and/or biuret and
 c''. 0 to 0.2 mole of a urea derivative that is different from (c').

7. Reaction product according to claim 6, wherein urea on its own is used as constituent (c').

8. Reaction product according to claim 1, wherein an aqueous formaldehyde solution or paraformaldehyde is used as constituent d.

9. Reaction product according to claim 6, wherein methylolated condensation products of 1 mole of the constituents (c') and 0 to 0.2 mole of the constituent (c'') with constituent (d) are used as reaction product (B).

10. Reaction product according to claim 9, wherein dimethylolurea on its own is used.

11. Process for the manufacture of a reaction product according to claim 1, wherein A 100 parts by weight of condensation product from
 a 1 mole of a hydroxyphenylsulphone-hydroxymethylmonosulphonic acid having 1 to 4 hydroxyphenylsulphone groups per molecule, and
 b. 0.1 to 0.6 mole of an alkoxybenzene having 1 to 4 carbon atoms in the alkoxy radical
are reacted, at elevated temperature in an aqueous-acid medium, with
 B. 10 to 40 parts by weight of a reaction product or of a mixture of
 c. 1 mole of urea and/or of an urea derivative, and
 d. 1 to 4 moles of formaldehyde or of an agent releasing formaldehyde;
and, after completed reaction, the reaction mixture is neutralised.

12. Process for tanning and re-tanning skins and leather, wherein skins or leather are treated with an aqueous solution containing a reaction product according to claim 1, the material tanned in this manner is then rinsed and subsequently stuffed and dried.

13. The leather tanned by a process according to claim 12.

* * * * *